(12) United States Patent
Sundaravadivel et al.

(10) Patent No.: US 11,973,724 B2
(45) Date of Patent: Apr. 30, 2024

(54) CHATBOT FRAMEWORK SUPPORTING RELATIONAL DATABASE SCHEMA

(71) Applicant: Zoho Corporation Private Limited, Chengalpattu Taluk (IN)

(72) Inventors: Ramkumar Sundaravadivel, Dharmapuri (IN); Kesavan Udhaya Kumar, Madurai (IN); Gokulnath Selvaraj, Chennai (IN); Udhaya Girish Purushothaman, Chennai (IN); Sundharesan Kanagaraj, Chennai (IN)

(73) Assignee: Zoho Corporation Private Limited, Chengalpattu Taluk (IN)

( * ) Notice: Subject to any disclaimer, the term of this patent is extended or adjusted under 35 U.S.C. 154(b) by 163 days.

(21) Appl. No.: 17/218,108

(22) Filed: Mar. 30, 2021

(65) Prior Publication Data
US 2021/0306287 A1    Sep. 30, 2021

Related U.S. Application Data

(60) Provisional application No. 63/083,051, filed on Sep. 24, 2020.

(51) Int. Cl.
*G06F 16/00*     (2019.01)
*G06F 16/242*    (2019.01)
*G06F 40/205*    (2020.01)
*G06F 40/35*     (2020.01)
*H04L 51/02*     (2022.01)

(52) U.S. Cl.
CPC .......... *H04L 51/02* (2013.01); *G06F 16/2433* (2019.01); *G06F 40/205* (2020.01); *G06F 40/35* (2020.01)

(58) Field of Classification Search
CPC ...... G06F 40/35; G06F 40/30; G06F 16/2433; G06F 40/205
See application file for complete search history.

(56) References Cited

U.S. PATENT DOCUMENTS

| | | | |
|---|---|---|---|
| 10,992,604 B1* | 4/2021 | Knas | H04L 51/04 |
| 2019/0043483 A1* | 2/2019 | Chakraborty | G10L 15/063 |
| 2019/0180258 A1* | 6/2019 | Amar | H04L 51/02 |
| 2019/0217206 A1* | 7/2019 | Liu | A63F 13/798 |
| 2019/0259036 A1* | 8/2019 | Chakraborty | G06N 3/044 |
| 2020/0342850 A1* | 10/2020 | Vishnoi | H04L 51/214 |
| 2020/0344185 A1* | 10/2020 | Singaraju | G06F 18/24 |

* cited by examiner

*Primary Examiner* — Yicun Wu
(74) *Attorney, Agent, or Firm* — Ahmann Kloke LLP

(57) ABSTRACT

A multi-turn context-aware chatbot is disclosed. A framework to create a multi-turn context-aware chatbot can make use of a database schema. A system that includes a multi-turn context-aware chatbot can include a criteria tuple extractor. A method for carrying out multi-turn context-aware chat can include implicit reference resolution.

12 Claims, 20 Drawing Sheets

CHATBOT FRAMEWORK SUPPORTING RELATIONAL DATABASE SCHEMA

CROSS-REFERENCE TO RELATED APPLICATIONS

The present application claims priority to Indian Provisional Patent Application No. 202041014208 filed Mar. 31, 2020 and U.S. Provisional Patent Application Ser. No. 63/083,051 filed Sep. 24, 2020, which are incorporated by reference herein.

DETAILED DESCRIPTION

Figure 1:
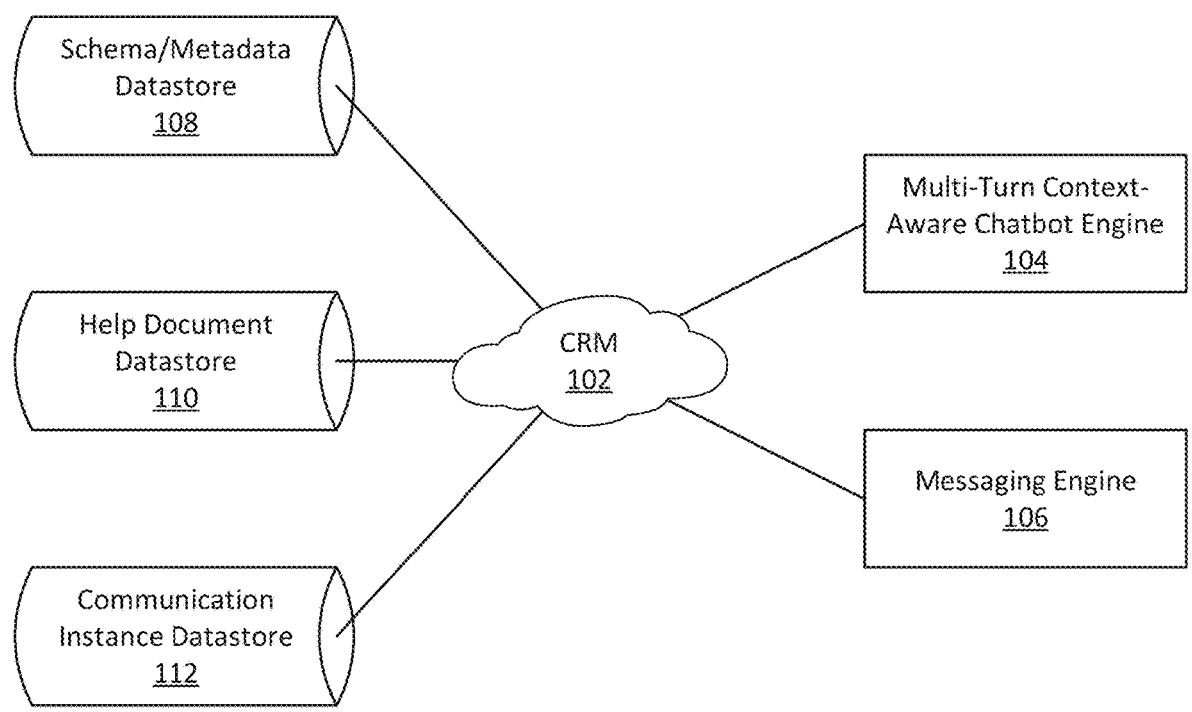
FIG. 1 depicts a diagram of an example of a multi-turn context-aware chatbot system.
Figure 2:
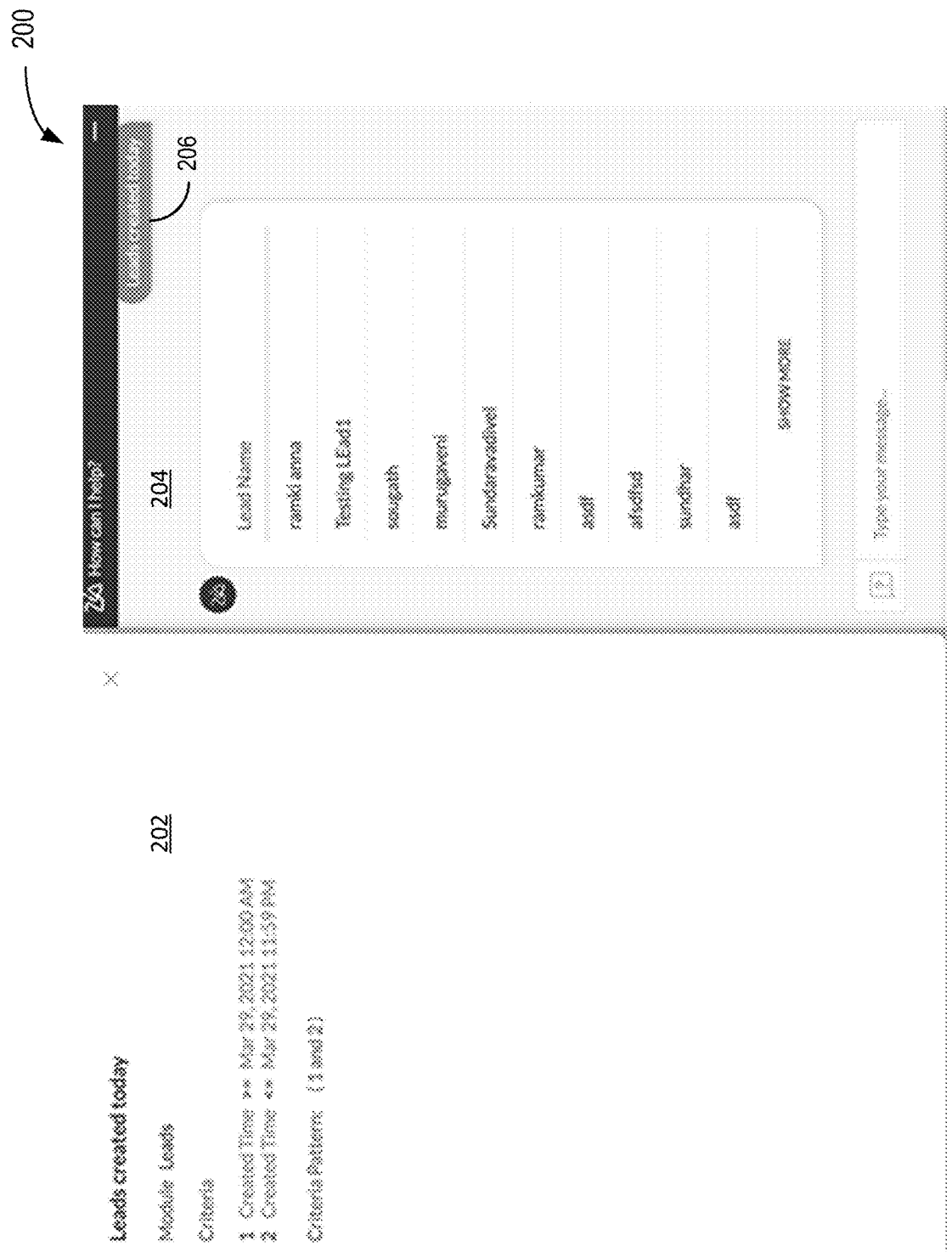
FIG. 2-5 are screenshots intended to illustrate aspects of a multi-turn context-aware chatbot engine.
Figure 3:
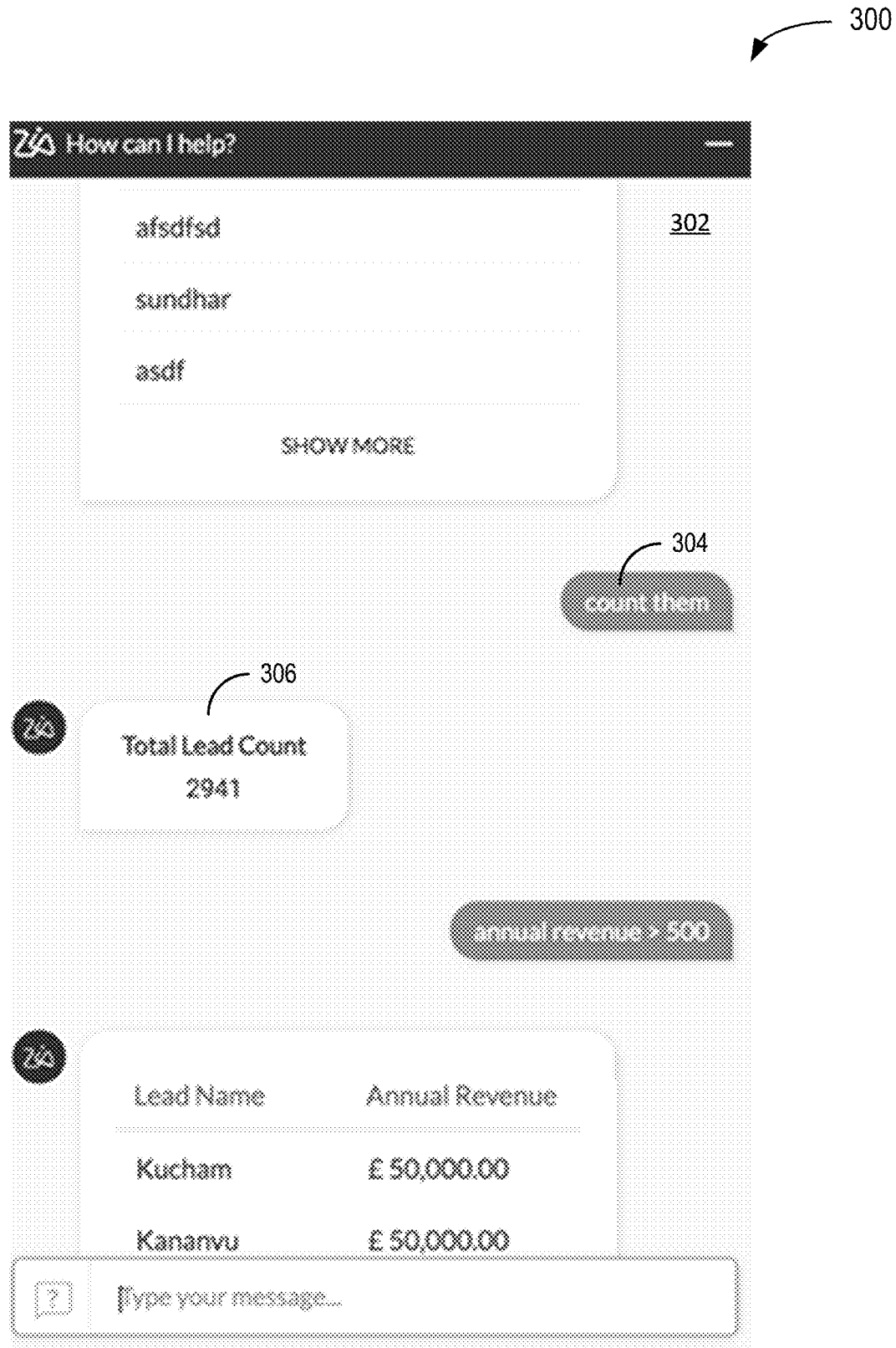
Figure 4:
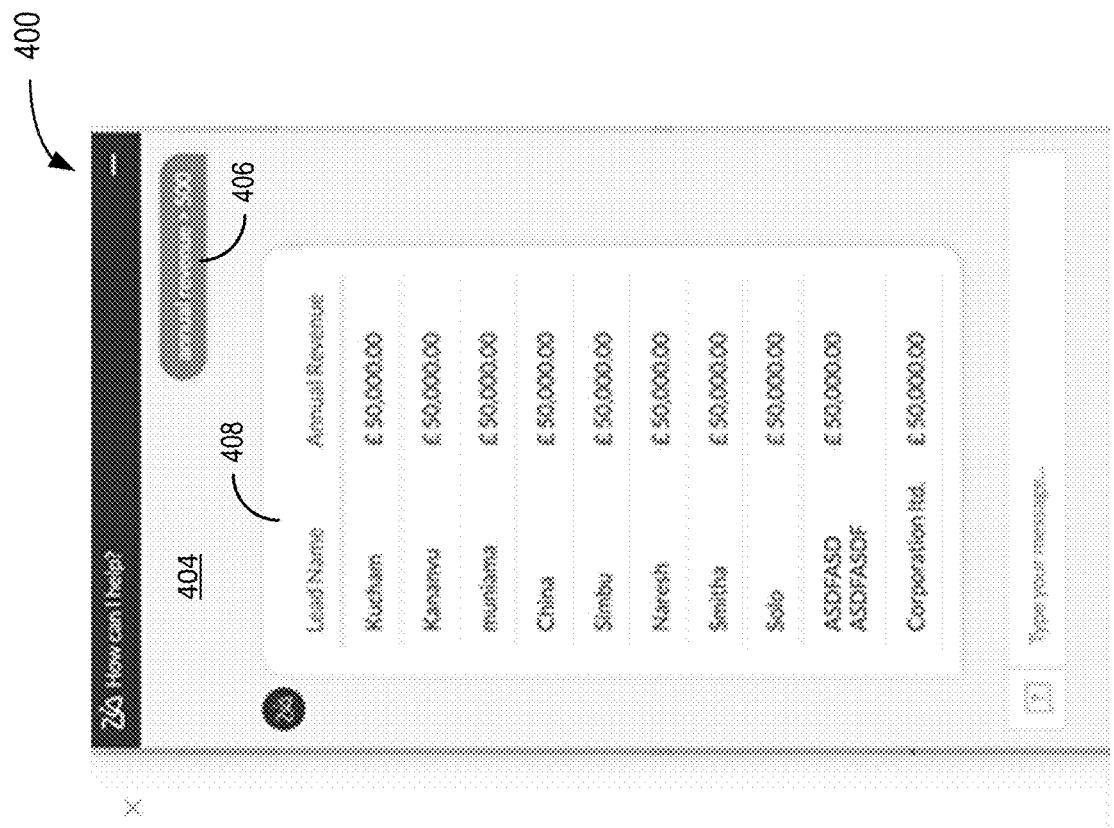
Figure 5:
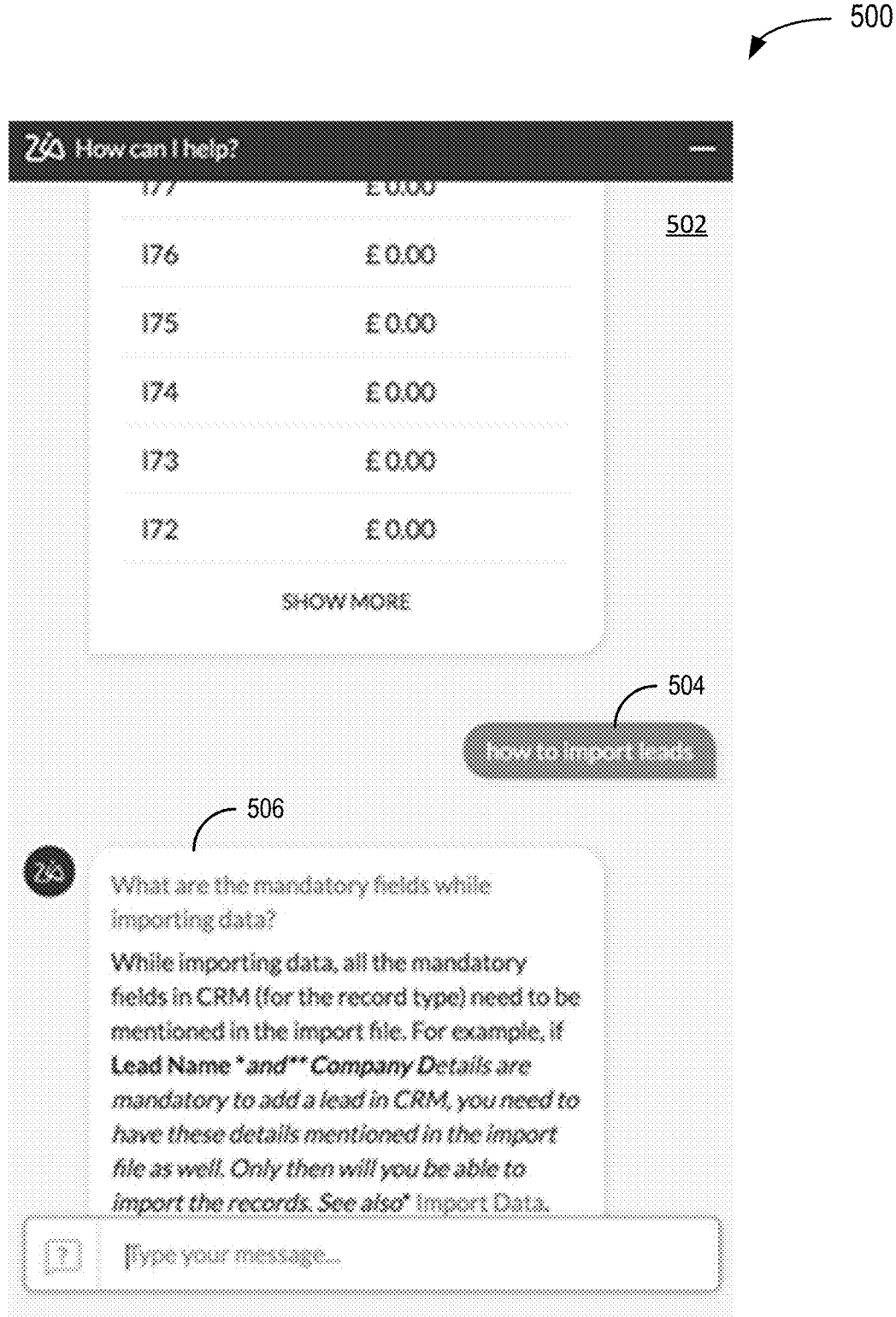

The multi-turn context-aware chatbot engine is intended to represent an engine used to facilitate communication between an automated agent of a first entity (a "first party") and a human or artificial agent of a second entity (a "second party"). As such, the multi-turn context-aware chatbot engine can be characterized as a component of a dialog system. For example, the first party can automate a conversation with the second party using messaging platforms. Under applicable circumstances, the communication instance can be characterized as on-line chat. In a specific implementation, the multi-turn context-aware chatbot engine uses a text-to-SQL parser, as discussed in greater detail below.

In order to enable communication between the two parties, a communication channel is instantiated. It is technically possible to make use of asynchronous communications such as email, though some of the advantages of making use of a chatbot are lessened. Accordingly, in a specific implementation, a synchronous communication channel is instantiated. The communication channel can be instantiated using an applicable technology, such as a messaging application, VoIP, or another technology that, ideally, enables a stateful connection between the parties.

In a specific implementation, the first entity is an entity that wishes to use the multi-turn context aware chatbot in lieu of providing a human agent for customer service, request routing, information gathering, or other purposes. However, there is no technical prohibition against the first entity having some other motivation for providing chatbot functionality. The first party may be referred to in this paper as the communication instantiator with the understanding the chatbot can be provided as a service by the first entity, by a third entity on behalf of the first entity, or by a third entity on behalf of multiple entities including the first entity, and the above-mentioned discussion of communications technology is abstracted away. The use of the term chatbot instantiator is not intended to be restrictive in who initiates a chat session (e.g., the second party could "initiate" the chat) or to suggest ownership over technology used to instantiate a communication channel.

Typically, the human or artificial agent of the second entity is a human who interacts with the multi-turn context aware chatbot via a chat interface, though it is technically possible for two artificial agents to participate in an instantiated communication. The second entity can be an individual acting in their own commerce-, education-, entertainment-, finance-, health-, news-, or productivity-related interests, or other personal interest, or a legal entity, such as a corporation, whose interests are represented by a human or artificial agent. In a specific implementation, the second party engages with the chatbot using a text-based interface or a voice-to-text interface such that the multi-turn context-aware chatbot receives communications from the human or artificial agent of the second entity in a text format. If applicable, the chatbot can receive communications in a format other than text, but the examples provided in this paper assume text for illustrative purposes.

FIG. 1 depicts a diagram 100 of an example of a multi-turn context aware chatbot system. The diagram 100 includes a computer-readable medium (CRM) 102, a multi-turn context-aware chatbox engine 104 coupled to the CRM 102, a messaging engine 106 coupled to the CRM 102, a schema/metadata datastore 108 coupled to the CRM 102, a help document datastore 110 coupled to the CRM 102, and a communication instance document datastore 112 coupled to the CRM 102. The term "schema" refers to the organization of data as a blueprint of how a database is constructed (e.g., divided into tables in the case of relational databases). A database schema specifies, based on a database administrator's knowledge of possible applications, facts that can enter the database, or those of interest to possible end-users.

The CRM 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The CRM 102 and other computer readable mediums discussed in this paper are intended to represent a variety of potentially applicable technologies. For example, the CRM 102 can be used to form a network or part of a network. Where two components are co-located on a device, the CRM 102 can include a bus or other data conduit or plane. Where a first component is co-located on one device and a second component is located on a different device, the CRM 102 can include a wireless or wired back-end network or LAN. The CRM 102 can also encompass a relevant portion of a WAN or other network, if applicable.

The devices, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g., "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor that is a component of the engine. The processor transforms data into new data using implemented data structures and methods, such as is described with reference to the figures in this paper.

Returning to the example of FIG. 1, the multi-turn context-aware chatbot engine 104 is intended to represent an engine for that uses communication state to determine a response to a message from the second party. The manner in which the multi-turn context-aware chatbot engine 104 operates is described with reference to FIGS. 2-6 below. Engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

The messaging engine 106 is intended to represent an engine that facilitates messaging between the first party and the second party. In a specific implementation, the messaging engine 106 includes a messaging application.

The multi-turn context-aware chatbot engine 104 uses the schema/metadata datastore 108 to generate an appropriate response to a message. In the event a help context is identified, the multi-turn context aware chatbot engine 104 can provide help documentation from the help document datastore 110. As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

A database management system (DBMS) can be used to manage a datastore. In such a case, the DBMS may be thought of as part of the datastore, as part of a server, and/or as a separate system. A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the repositories described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

The communication instance datastore 112 is intended to represent data associated with dialog state following a communication channel instantiation. The representation of state (including historical and current state) is referred to in this paper as a communication instance with the understanding the underlying technology used to instantiate the connection can be abstracted away. That is, the communication instance is intended to represent logical state and historical data associated with the communication. Where a distinction is desired, the underlying connection technology and communication instance can together be referred to as a communication channel instance.

FIGS. 2-5 are screenshots 200-500 intended to illustrate aspects of a multi-turn context-aware chatbot engine. The messages provided by way of example in the screenshots 200-500 are described in greater detail in association with FIG. 6, below. As used in this paper, a query-response pair is referred to as a turn.

In the screenshot 200, pane 202, module leads created today are depicted. (Note: The pane 202 may or may not be included in a screenshot visible to a typical user of the system and is provided for illustrative purposes.) As shown by way of example in window 204, "Leads created today" is provided as a message 206, which triggers the query. Because the communication instance is stateful, the results of this query can be set as context.

In the screenshot 300, window 302, "count them" is provided as a message 304. In response, the chatbot counts the number of records retrieved in the earlier query, which is provided as a message 306. Because the communication instance state is utilized as context for the query, the response is context-aware.

In the screenshot 400, pane 402 the query "annual revenue>500" is depicted. As shown by way of example in window 404, "annual revenue>500" is provided as a message 406, which triggers the query. The message 408 includes the response to the context-sensitive query, which includes "Leads created today" for which "annual revenue>500".

In the screenshot 500, window 502, in response to "how to import leads" in message 504, the chatbot resolves the message as a help request and changes the context to resolve the request as a help document query, providing the results of such a query in the message 506.

Figure 6:
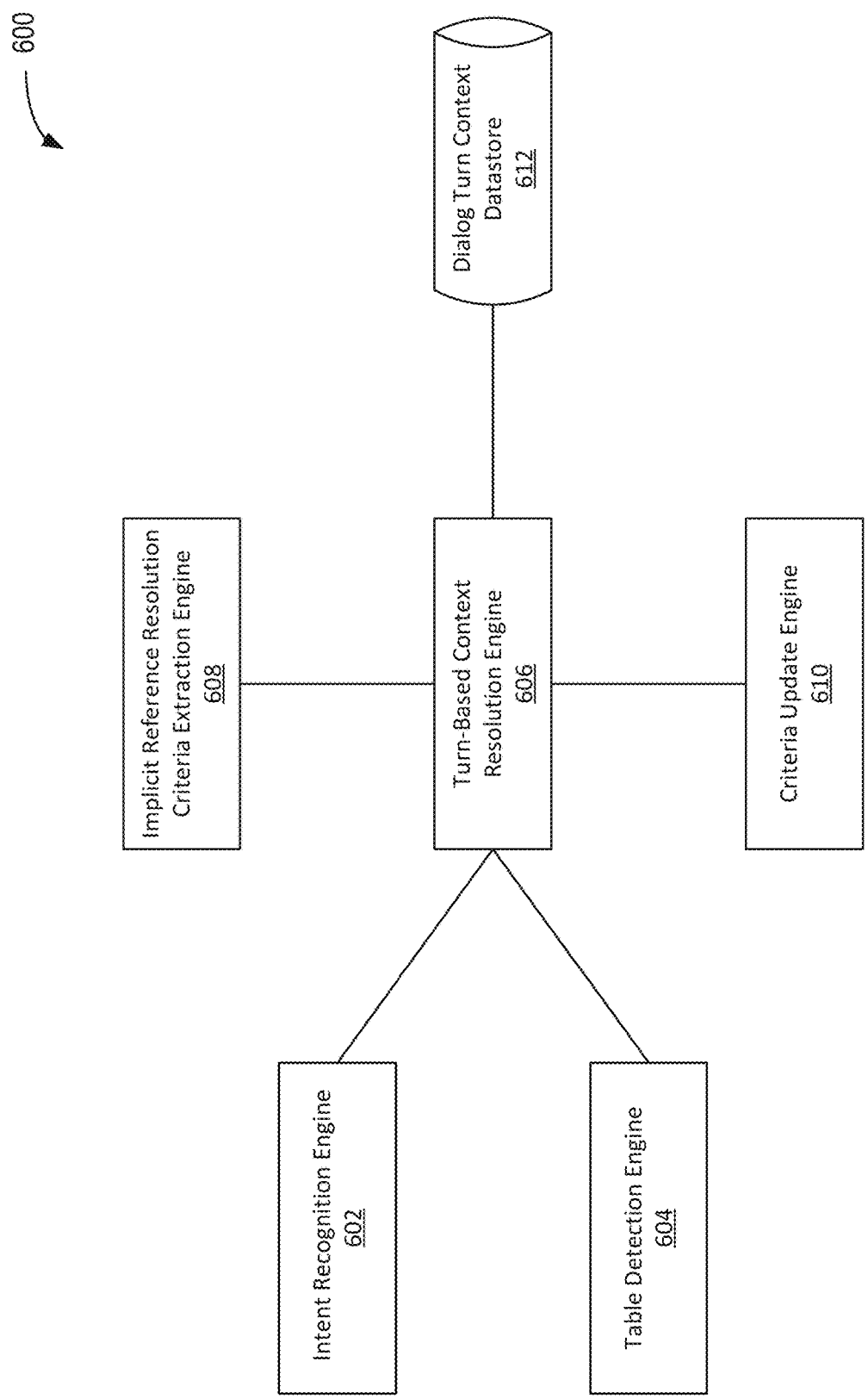
FIG. 6 is a diagram of an example of a multi-turn context aware chatbot engine.
Figure 7:
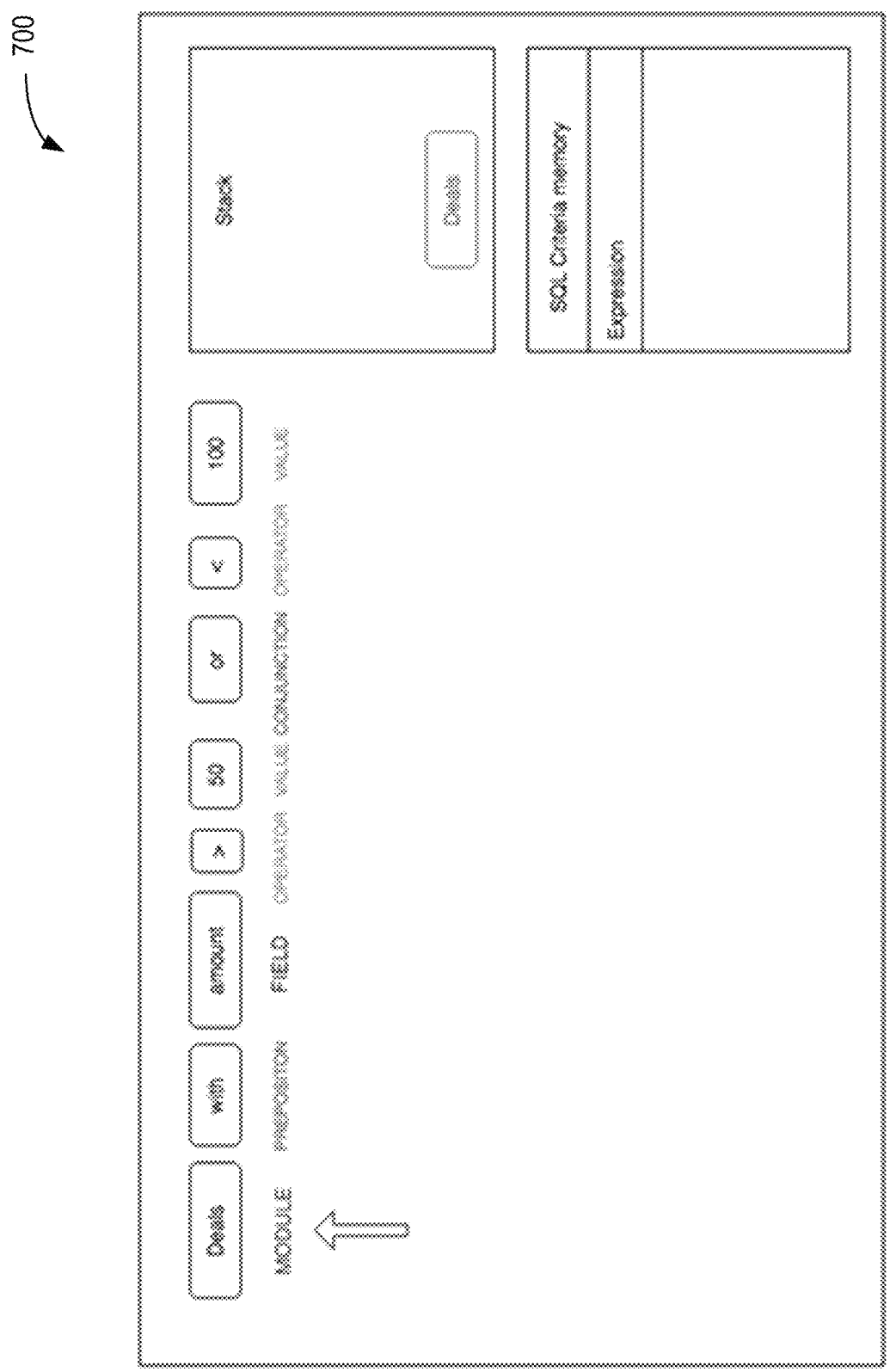
FIGS. 7-18 depicts diagrams of an example of an implicit reference resolution criteria extraction flow.
Figure 8:
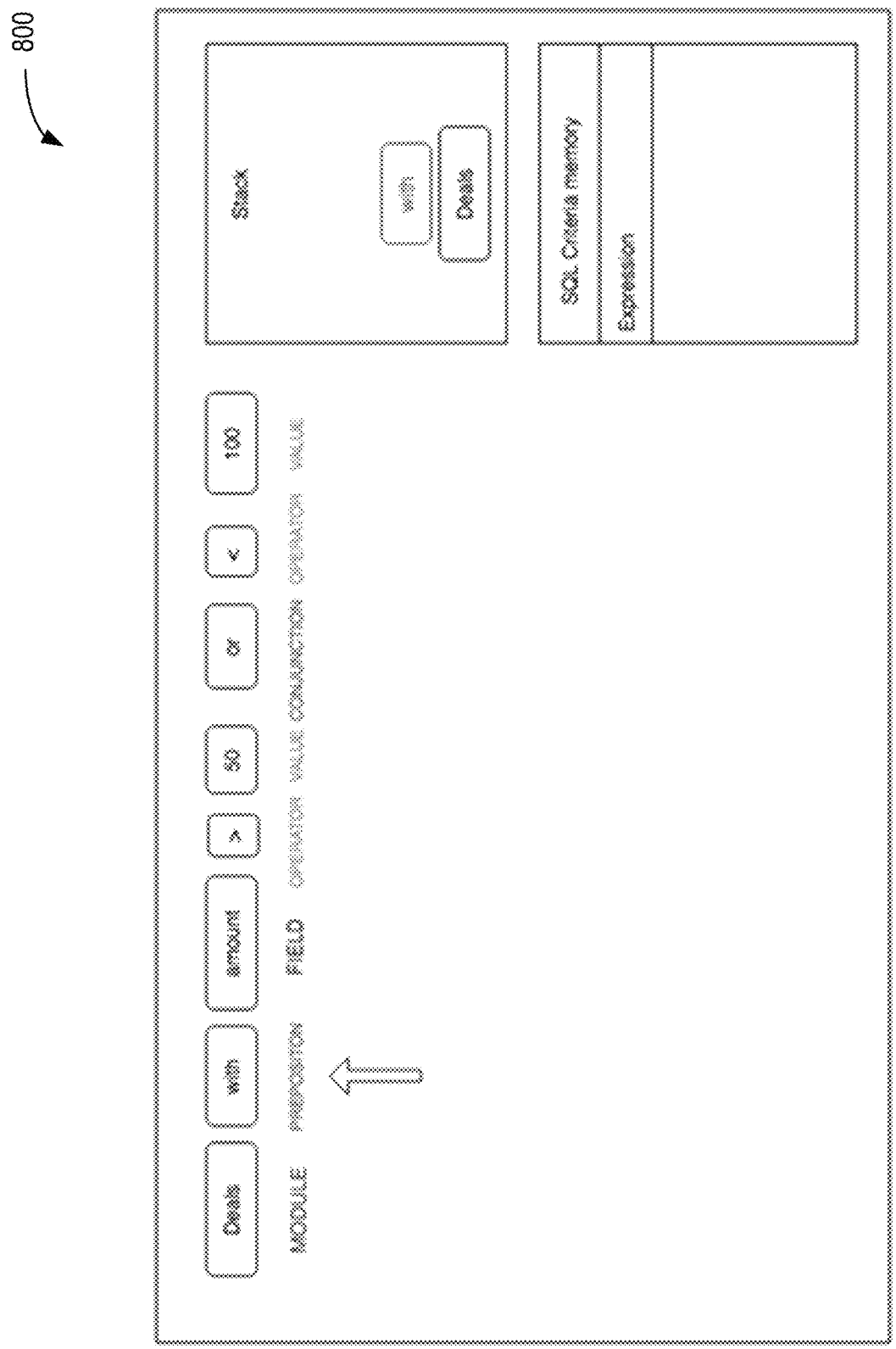
Figure 9:
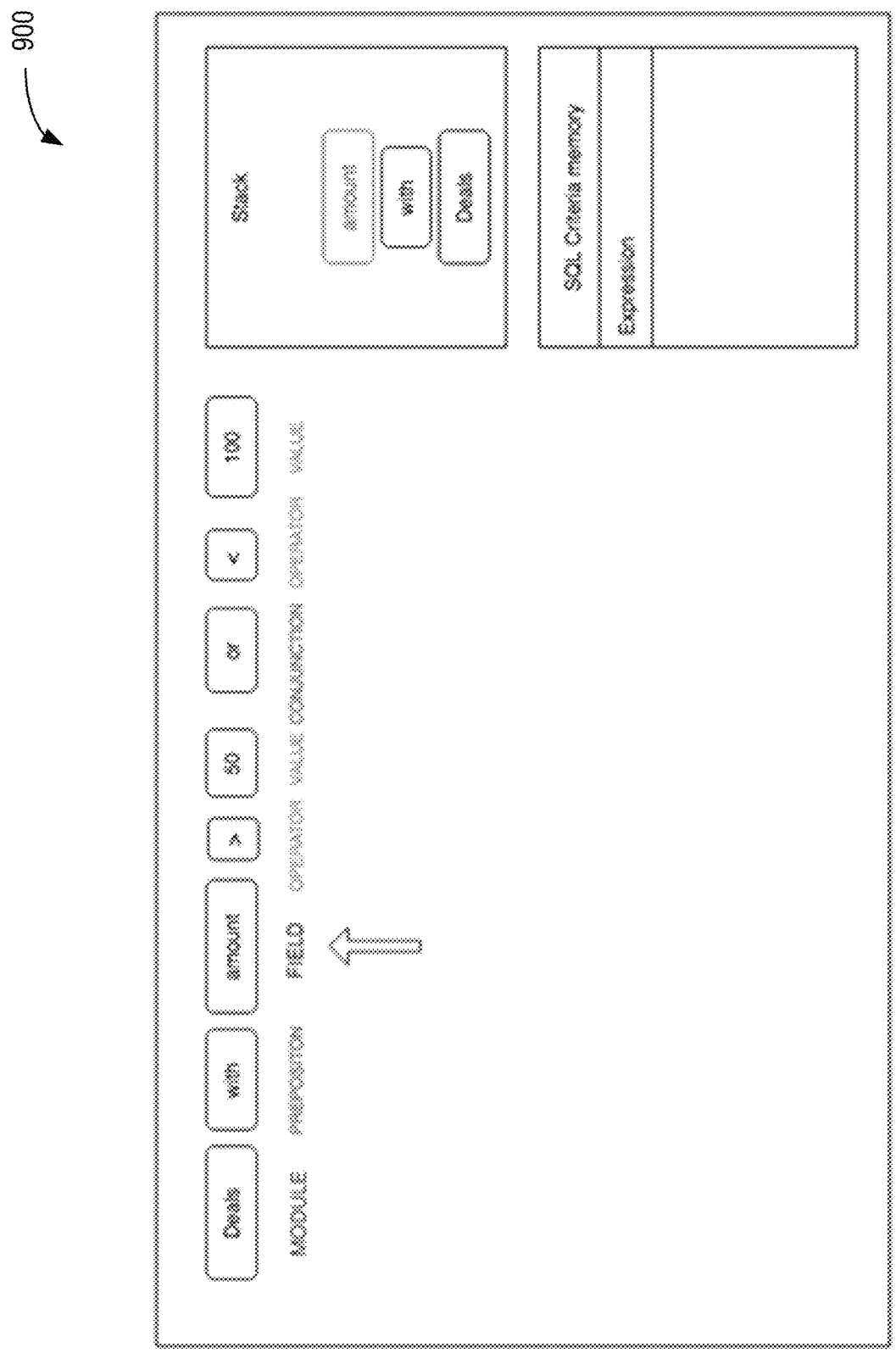
Figure 10:
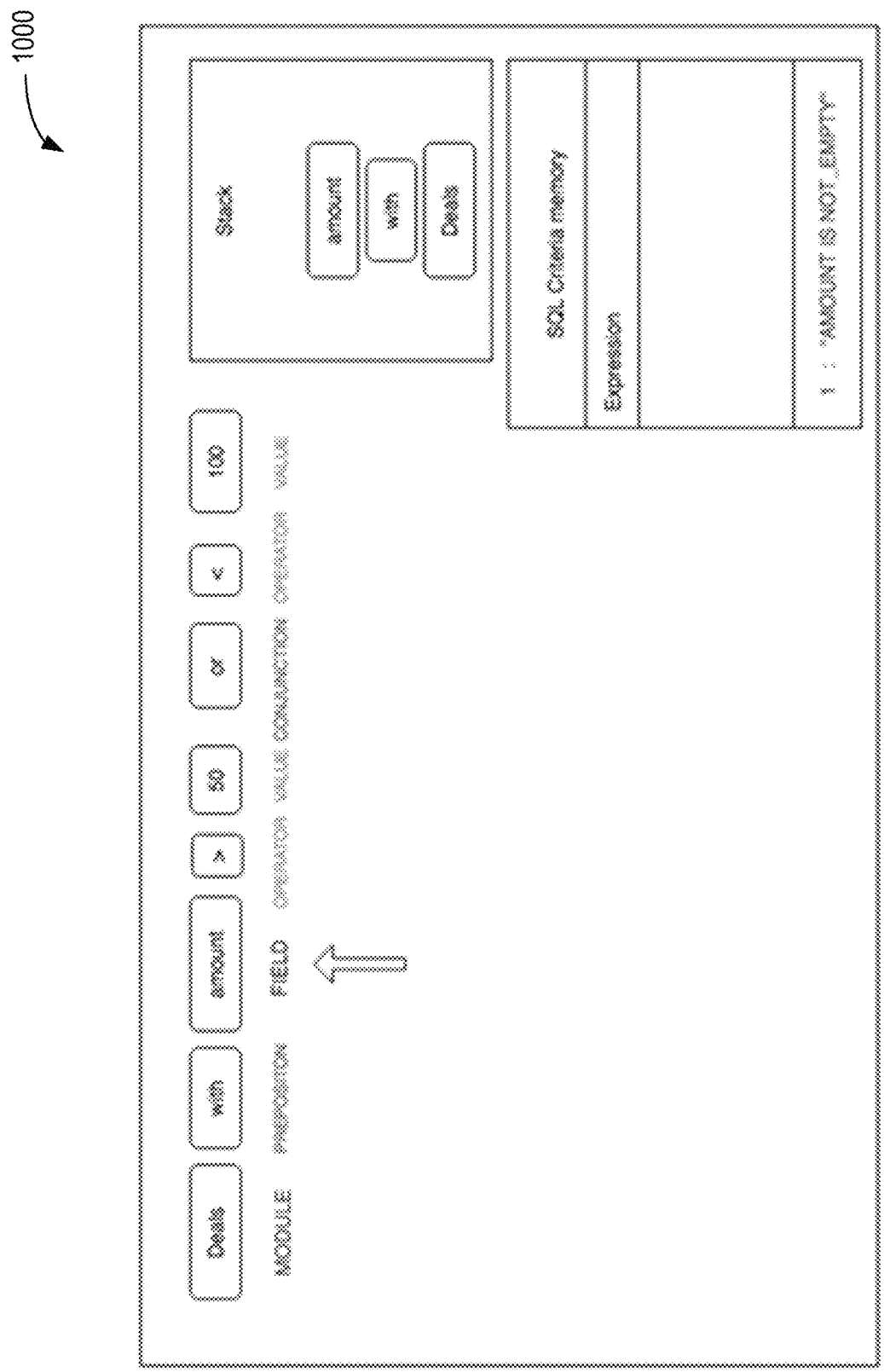
Figure 11:
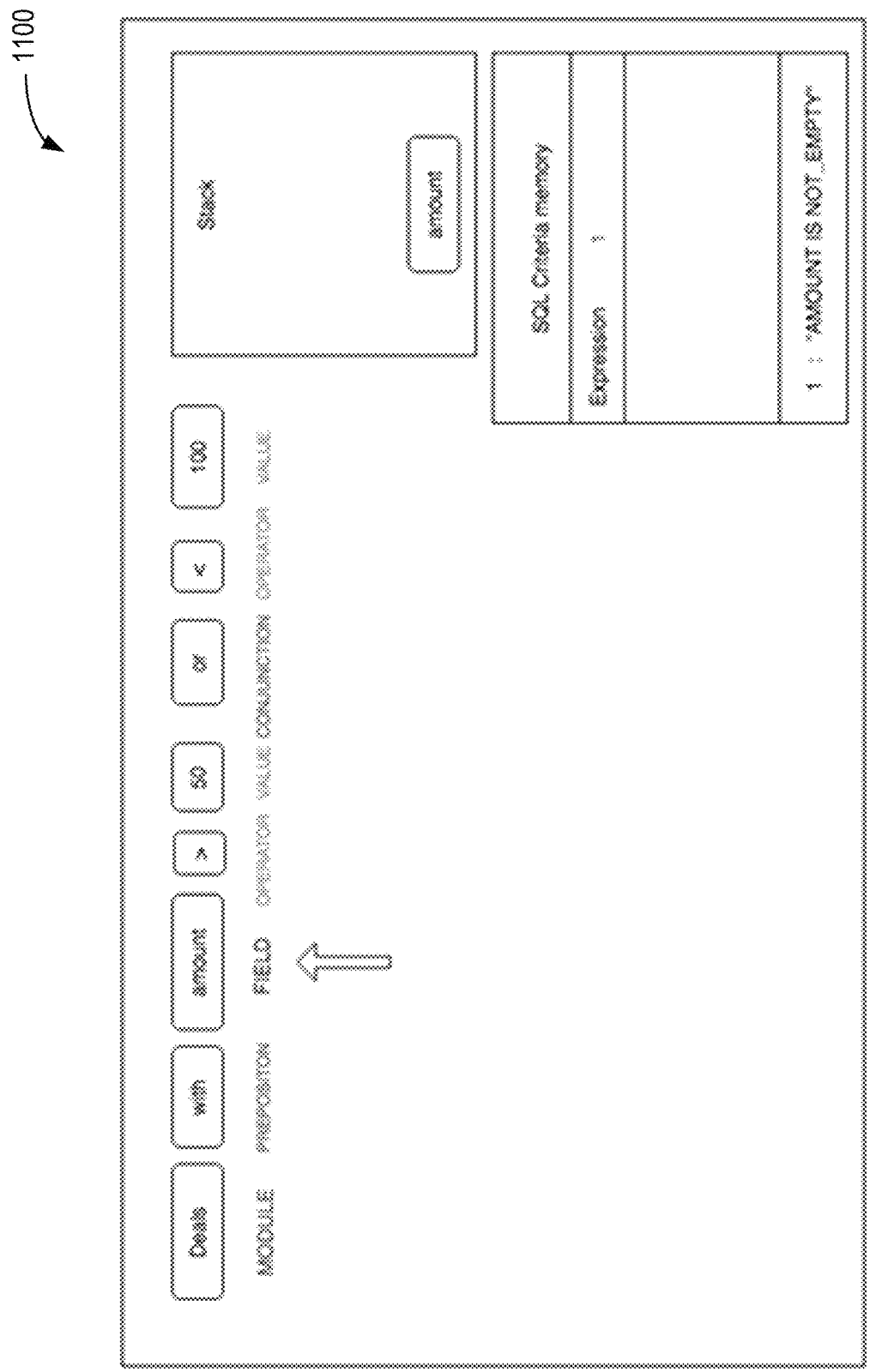
Figure 12:
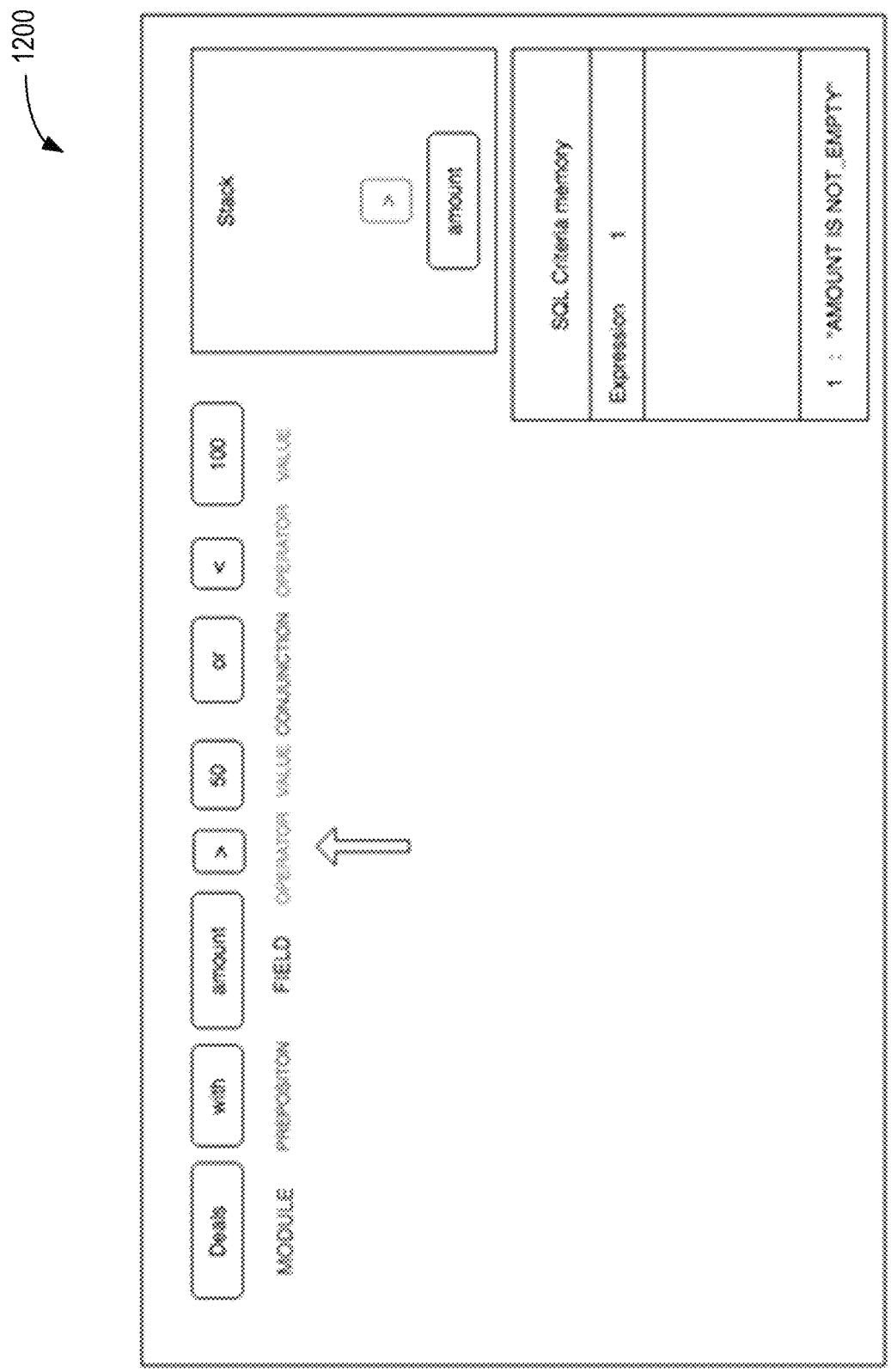
Figure 13:
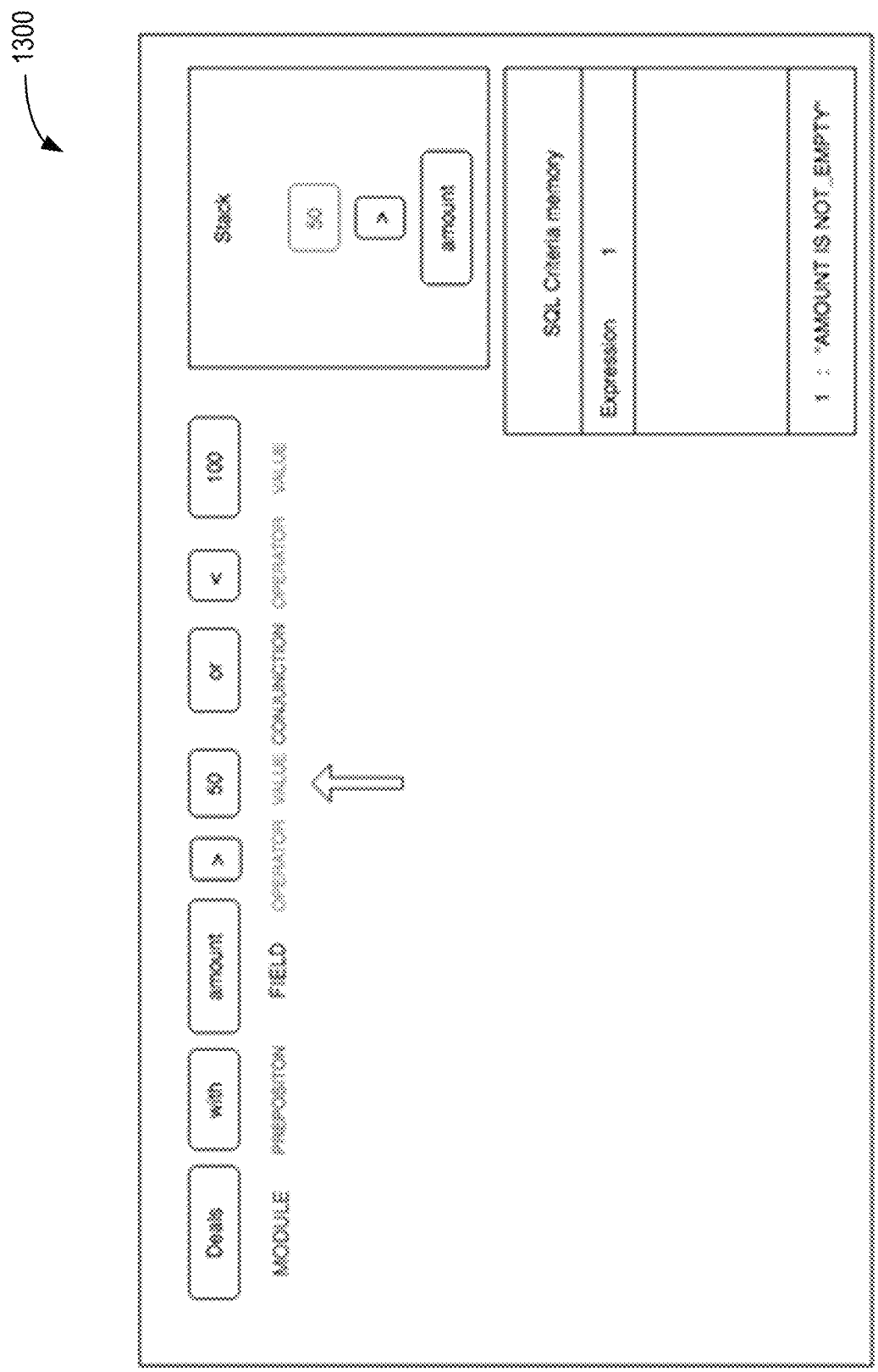
Figure 14:
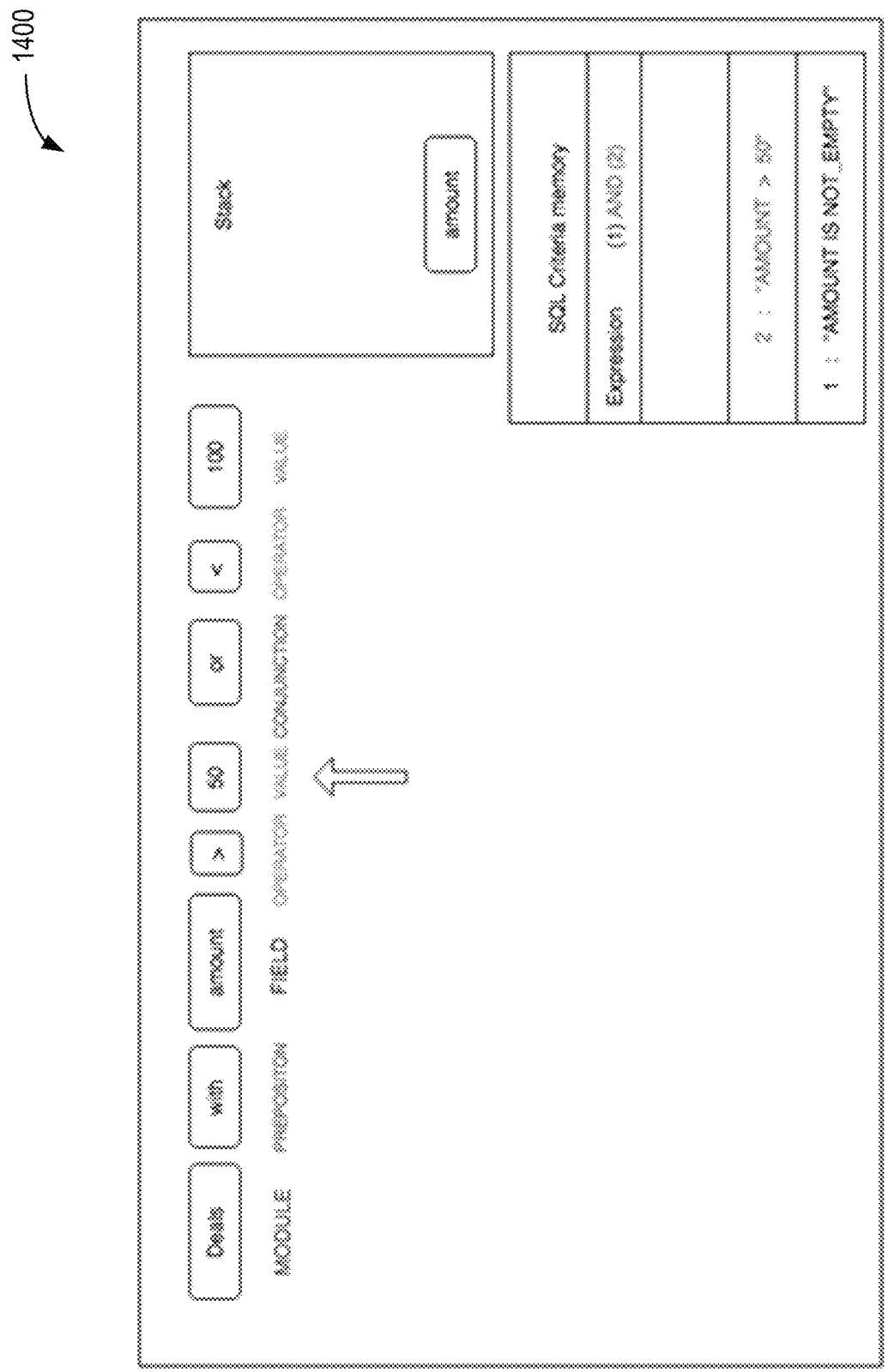
Figure 15:
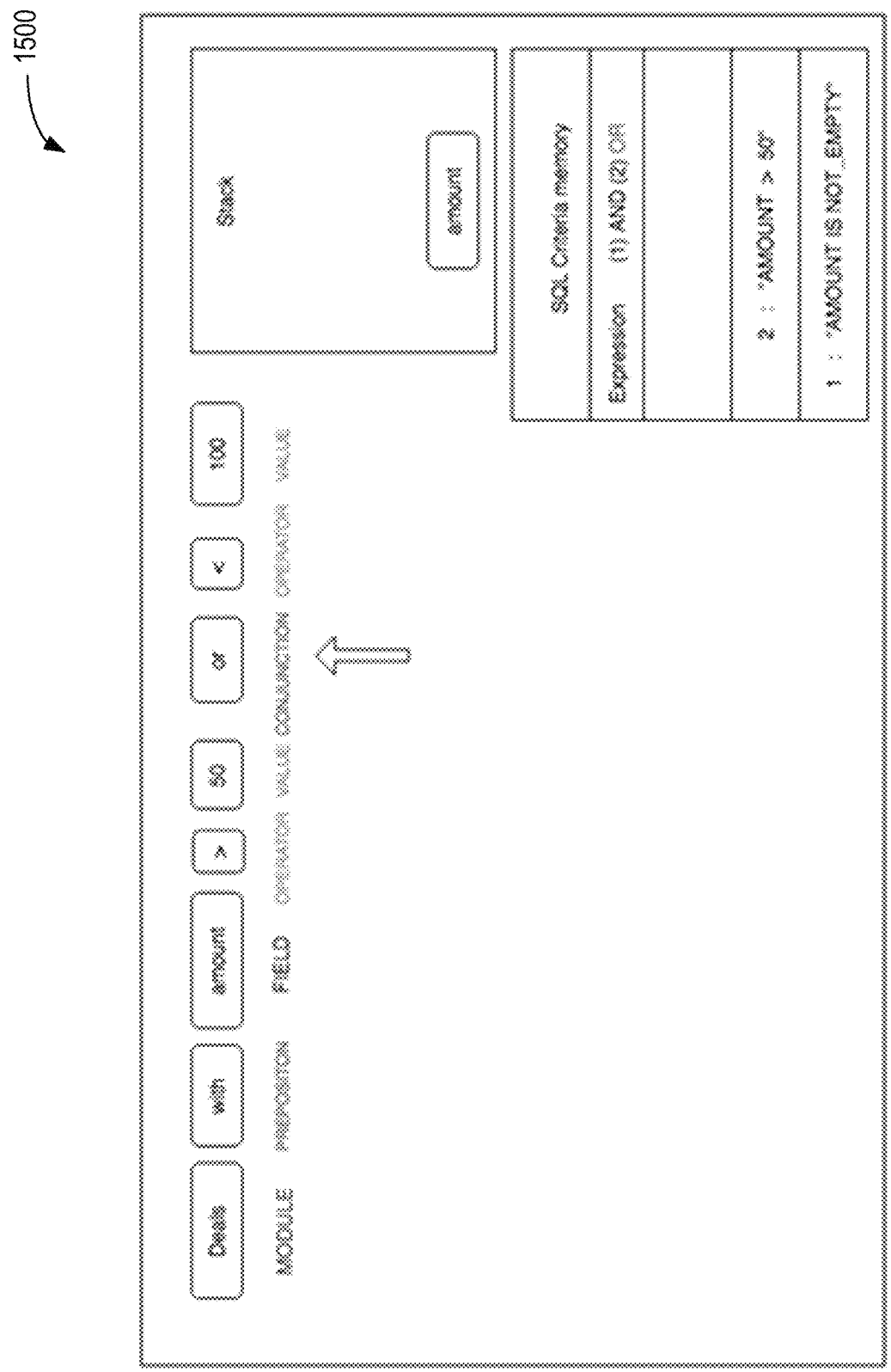
Figure 16:
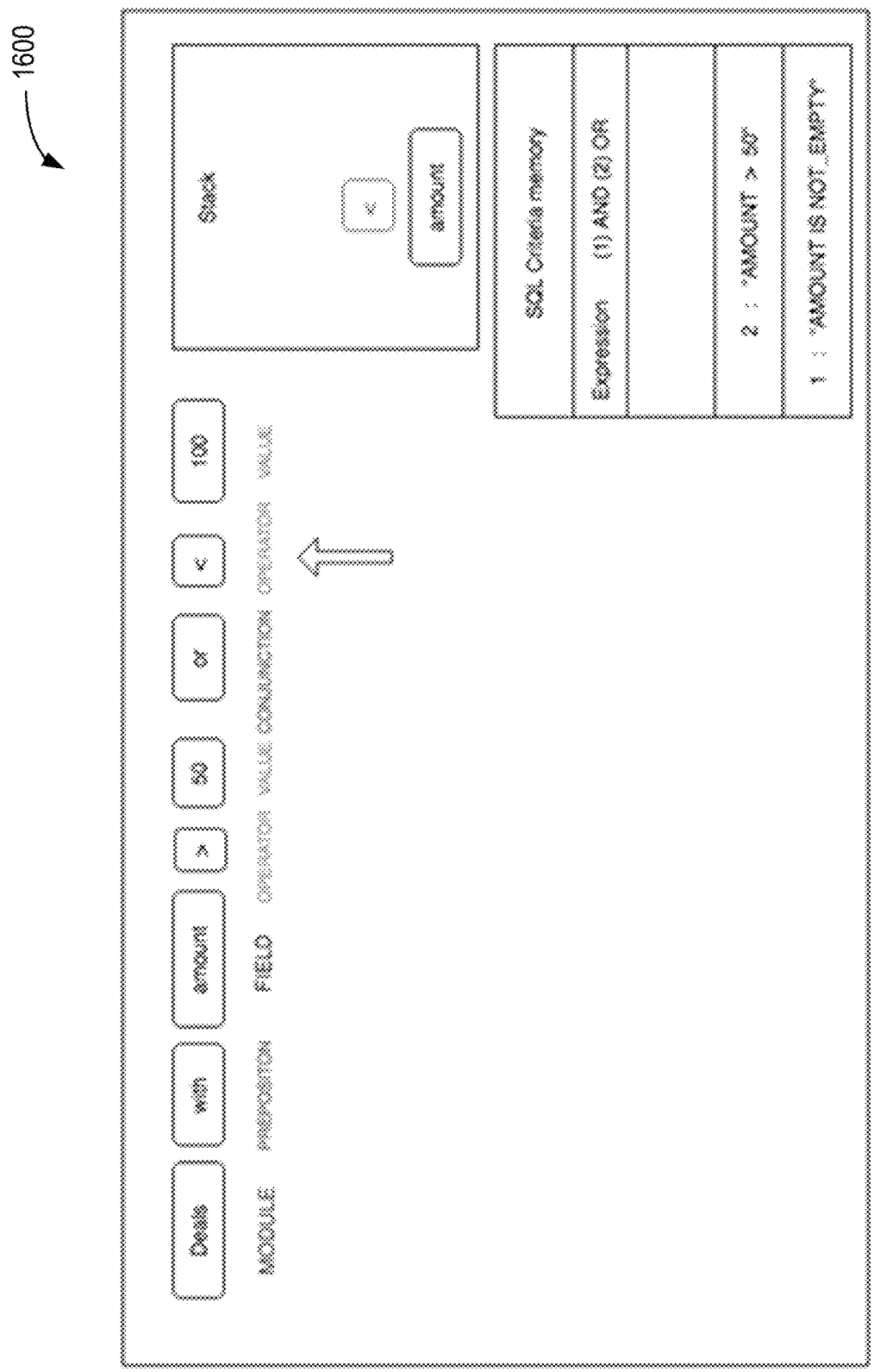
Figure 17:
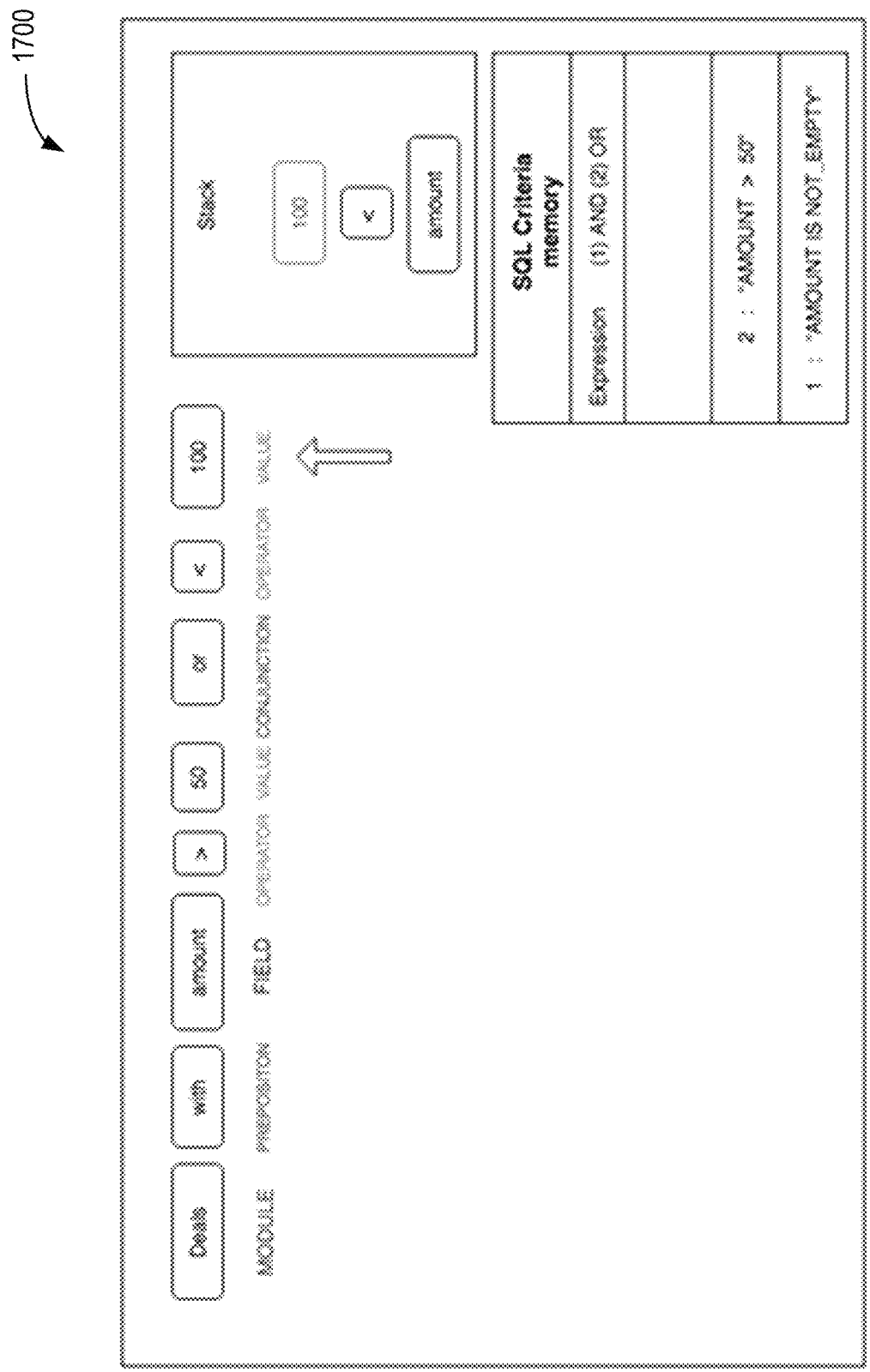
Figure 18:
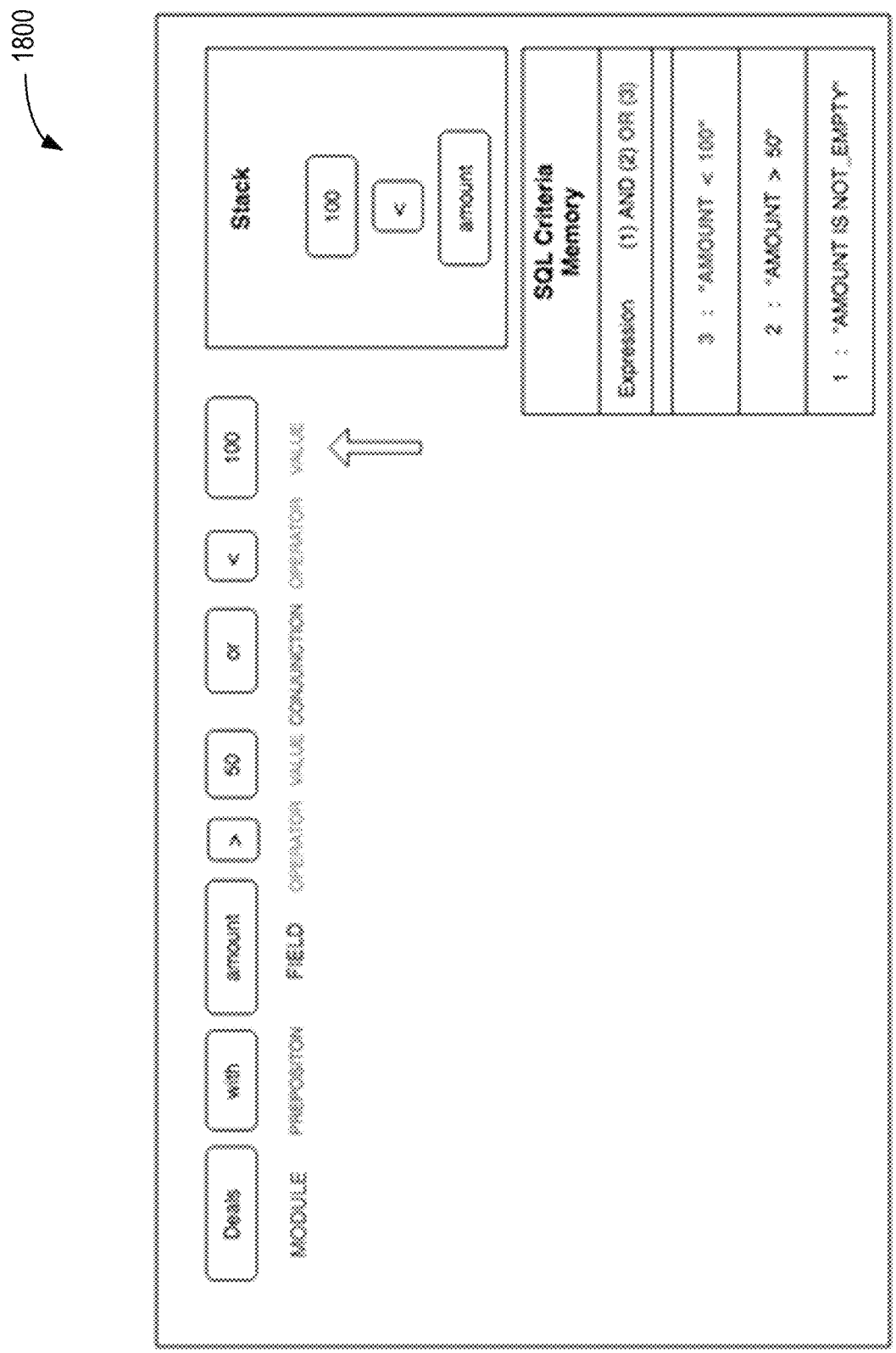

FIG. 6 is a diagram 600 of an example of a multi-turn context aware chatbot engine. In a specific implementation, the multi-turn context aware chatbot engine includes a text-to-SQL parser. The diagram 600 includes an intent recognition engine 602, a table detection engine 604, a turn-based context resolution engine 606 coupled to the intent recognition engine 602 and the table detection engine 604, an implicit reference resolution criteria extraction engine 608 coupled to the turn-based context resolution engine 606, a criteria update engine 610 coupled to the turn-based context resolution engine 606, and a dialog turn context datastore 612 coupled to the turn-based context resolution engine 606.

Query 1-->Leads Created Today

The intent recognition engine 602 finds "database intent." The table detection engine 604 extracts a module in accordance with a determination the appropriate table is "Leads." The turn-based context resolution engine 606 determines whether context is empty, which it is not. The criteria update engine 610 pushes the chatbot full flow result to the dialog turn context datastore 612. The turn-based context resolution engine 606 generates a query appropriate for the context: SQL query, table name, criteria expression, DB metadata schema (column names, data type), for example, lead stage, lead name, annual revenue, email id.

Query 2-->Annual Revenue>500

The intent recognition engine 602 finds "database intent." The table detection engine 604 finds no module in the query. The turn-based context resolution engine 606 determines whether context is empty, which it is not, finds no module, and takes context from the communication instance (in this example, Query 1). The implicit reference resolution criteria extraction engine 608 creates current criteria. The criteria update engine 610 pushes previous criteria and current criteria to the dialog turn context datastore 610. The turn-based context resolution engine 606 generates SQL using the criteria.

Query 3-->how to Create Deals?

The intent recognition engine 602 finds "help intent" and the turn-based context resolution engine 606 provides a help document.

The implicit reference resolution criteria extraction engine 608 is described in more detail now with reference to FIGS. 7-18. FIGS. 7-18 depicts diagrams 700-1800 of an example of an implicit reference resolution criteria extraction flow. In a specific implementation, the implicit reference resolution criteria extraction engine includes a criteria tuple extractor. A tuple, or triplet, can be represented as, for example, (amount, >, 50). In a specific implementation, the implicit reference resolution criteria extraction engine includes an SQL criteria extractor.

A select query criteria can be implemented as a logical tree data structure of criteria tuples. Each criteria tuple consists of three parts, operand/field, operator, and value. For example, the text string "Show me the Deals with Amount greater than 100" can be resolved to the criteria tuple (Amount, >, 100) and the text string "Show me the deals with amount greater than 100 which had been assigned to Venkat" can be resolved as a logic tree with two criteria tuples: ((Amount, >, 100) AND (Assigned To, =, VENKAT)). To extract a criteria tuple, tags provided from an entity detection engine are used.

Memory-based criteria extraction and implicit reference resolutions helps overcome the following challenges:

In a first challenge, column names are not explicitly mentioned for the second criteria when two different criteria are applied on the same column. For example, "Show me the deals which has amount greater than 30 but lesser than 100" includes two criteria tuples ((Amount, >, 30) AND (Amount, <, 100)) but the challenge here is for the second criteria because the message does not mention explicitly the column name Amount. Because the first tuple provides context, a memory-based criteria tuple extractor helps the criteria extraction engine utilize a stacking mechanism to extract criteria. Table 1 is illustrative:

TABLE 1

| DB Schema/metadata DEALS | | |
|---|---|---|
| Deal Name | Deal Owner | Amount |
| Amazon Deal for | Venkat | 50 |
| Goverment Pro | Ram | 200 |
| DTDC Deal | | 20 |
| Coversational AI | Saswata | 50 |

In a second challenge, a column name is not mentioned. For example, "Show me the Deals of Saswata" has an implicit intention to show deals where (Deal Owner, =, SASWATA) but no mention of the deal owner column is provided. An implicit resolution engine searches the database content with the keyword "Saswata", which returns a list of columns where the Name Saswata has appeared. To shortlist the best matching column, the implicit criteria resolution engine ranks the matched column names based on data types of the user input and the column datatype. Table 2 is illustrative:

TABLE 2

| DB Schema/metadata DEALS | | |
|---|---|---|
| Deal Name | Deal Owner | Amount |
| Amazon Deal for | Venkat | 50 |
| Government Pro | Ram | 200 |
| DTDC Deal | | 20 |
| Coversational AI | Saswatat | 50 |

In a third challenge, a criteria has to be derived from domain-specific key words. For example, "Show me the untouched Deals" includes domain-specific keywords that implicitly suggest criteria for a particular table. Specifically, in the sales domain untouched deals refers to deals for which (Deal Owner, =, Null) or, in other words, the message could be translated to "Show me the deals where Owner is None".

Advantageously, a domain-specific keyword injection engine enables a human or artificial agent (e.g., a platform developer) of a communication instantiator to inject domain special key words so an implicit resolution criteria extraction engine can incorporate them while finding the criteria. Pseudocode appropriate for this example is:

"special_keyword_criteria_map"[
{
"Table":"Deals",
"special_keyword":"untouched",
"criteria_tuple":("deal_owner",=,None)
}
]

After module detection, the Key Word Injection Module in the criteria extractor takes the special_keyword_criteria_map into consideration and adds and manipulates the criteria tuples along with the other extracted criteria tuples.

Here is an example of relationship extraction pseudocode:

```
relationship extraction( ) ->
   for token in entity_recognition_output:
      check the entity_label of token
         if entity_label = module :
            parseModule( )
         if entity_label = field :
            parseField( )
         if entity_label = text operator:
            parseTextOperator( )
         if entity_label = relational operator:
            parseRelationalOperator( )
         if entity_label = group by operator:
            parserGroupBy( )
         if entity_label = date/time:
            parseDateTime( )
         if entity_label = domain special words:
            parseDomain Words( )
         if entity_label = aggregate function
            parseAggregateFunction( )
         if entity_label = OOV
            parseOOV( )
synonym_resolver( ) ->
   resolve words/phrases with same meaning and replace with true_word.
   E.g.,
   "contains" -> "contain, contains, containing",
   "not_contains" -> "not contain, not contains, not containing"
   "starts_with" -> "start with, starts with, starting with",
parseModule( ) ->
   Add Module name ( table name ) to the SQL query
   Add module name as head_word in stack
parseField( ) ->
   push current_token as head_word to stack
   head_word = current_token
   head_word_data_type = current_token_data_type
   if data_type of head_word = text AND data_type of next token = oov:
      addCriteriaTuple( head_word, "contains" , next_token )
   if data_type of head_word = number AND data_type of next token = number:
      addCriteriaTuple( head_word, "=", next_token )
parseTextOperator( ) ->
   true_word = synonym_resolver()
   if true_word = "contains, starts_with, ends_with, not_contains":
      if data_type of head_word in stack is text
         addCriteriaTuple( head_word, true_word, next_token )
   if true_word = "between"
      if data_type of head_word in stack is number
         if data_type of 1st and 3rd token from the current token is number
            addCriteriaTuple( ( head_word, >=, 1st token), AND, ( head_word,
   <= , 3rd token ))
parseRelationalOperator( ) ->
   if data_type of head_word is number and next_token is number,
      addCriteriaTuple( head_word, current_token, next_token )
      amount > 50
      amount -> number
      > - current arrow
      50 -> number
parseDateTime( ) ->
   if data_type of head_word is date/time:
      if date/time is single value:
         addCriteriaTuple ( head_word, current_token, date/time)
      else if date/time is two values
         addCriteriaTuple( ( head_word, ">=", starting_time), AND, ( head_word,
"<=", ending_time ))
parseDomainWords( ) ->
   KeywordInjectionModule( ) ->
      check for Keywords and mapped criteria tuple to SQL criteria builder
parserGroupBy( )
   if next_token = field:
      addGroupByCriteria( "GROUP BY", next_token)
parseAggregateFunction( )
   dependency_graph = dependency_parser( )
   check dependency of current_token
   if entity_label of dependency = field:
      addAggregateFunction( current_token )
parseOOV( )
   if current_token is in DomainSpecialWord
      parseDomainWords( )
   else
      (field name, OOV token) <- search current_token in database
      addCriteria( field name, = ,OOV token )
```

Figure 19:
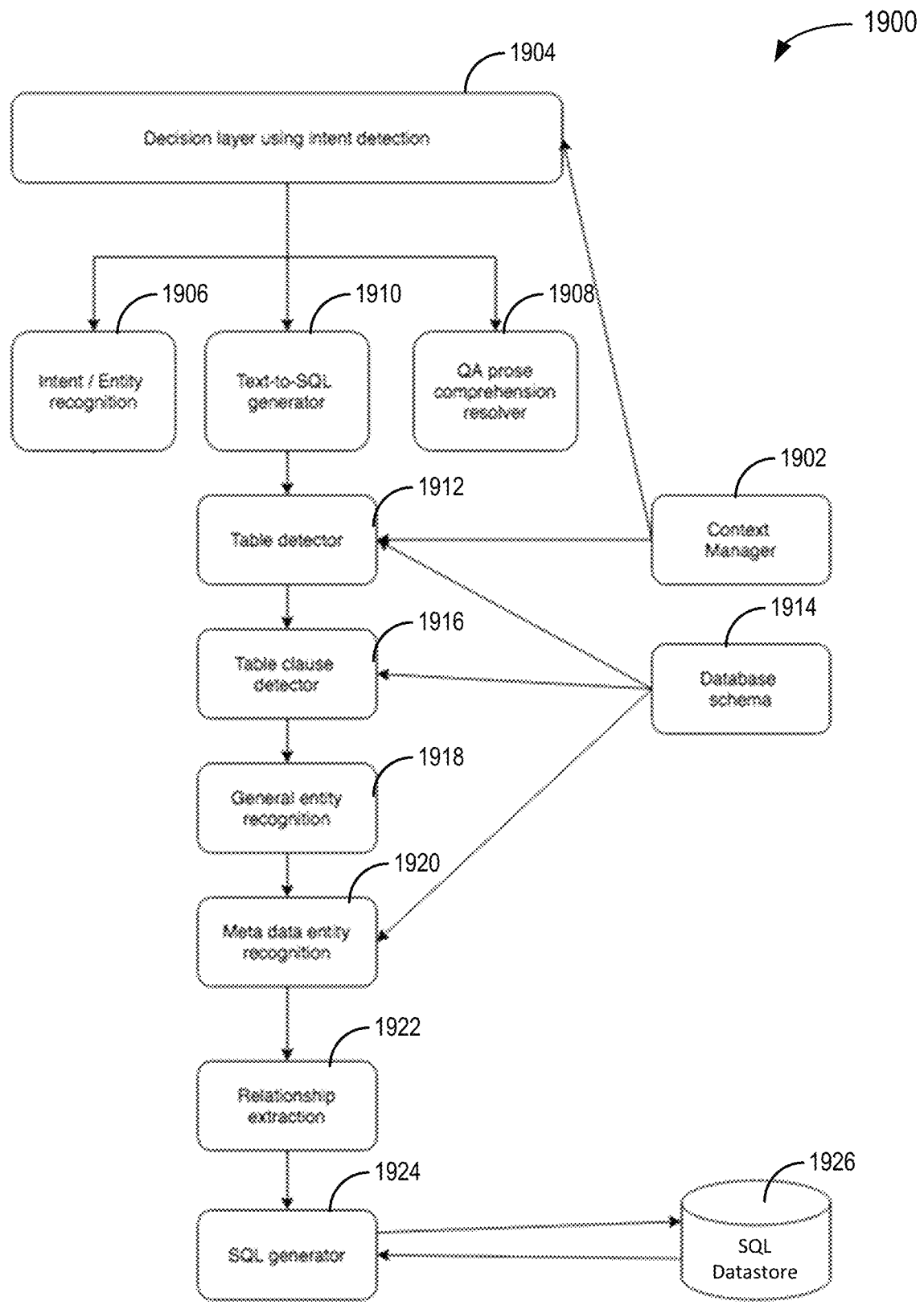
FIG. 19 depicts a flowchart of an example of method for multi-turn context-aware automated chat.

FIG. 19 depicts a flowchart 1900 of an example of method for multi-turn context-aware automated chat. The flowchart 1900 starts with context manager module 1902. An engine suitable for carrying out context management is a multi-turn context-aware chatbox engine, such as the multi-turn context-aware chatbox engine 104 of FIG. 1 and as described with reference to FIG. 6.

The flowchart 1900 continues to decision layer using intent detection module 1904. An engine suitable for carrying out intent detection is an intent recognition engine, such as the intent recognition engine 602 of FIG. 6.

The flowchart 1900 continues from modules 1904 to intent/entity recognition module 1906, to QA prose comprehension resolver module 1908, and to text-to-SQL generator module 1910. An engine suitable for carrying out intent detection is an intent recognition engine, such as the intent recognition engine 602 of FIG. 6. An engine suitable for carrying out intent detection is an intent recognition engine, such as the intent recognition engine 602 of FIG. 6. An engine suitable for carrying out text-to-SQL generation is a text-to-SQL parser as described with reference to FIG. 6.

The flowchart 1900 continues from module 1910 to table detector module 1912. An engine suitable for carrying out table detection is a table detection engine, such as the table detection engine 604 of FIG. 6.

The flowchart 1900 continues from both module 1912 and database schema module 1914 to table clause detector module 1916. An engine suitable for table clause detection is an implicit reference resolution criteria extraction engine, such as the implicit reference resolution criteria extraction engine 608 of FIG. 6.

The flowchart 1900 continues to general entity recognition module 1918. An engine suitable for general entity recognition is a turn-aware context resolution engine, such as the turn-based context resolution engine 606 of FIG. 6.

The flowchart 1900 continues to metadata entity recognition module 1920. An engine suitable for metadata entity recognition is a turn-aware context resolution engine, such as the turn-based context resolution engine 606 of FIG. 6.

The flowchart 1900 continues to relationship extraction module 1922. An engine suitable for relationship extraction is a turn-aware context resolution engine, such as the turn-based context resolution engine 606 of FIG. 6.

The flowchart 1900 continues to SQL generator module 1924. An engine suitable for SQL query generation is a criteria update engine, such as the criteria update engine 610 of FIG. 6.

The flowchart 1900 continues to SQL datastore 1926. A datastore suitable for acting as an SQL datastore is a dialog turn context datastore, such as the dialog turn context datastore 612 of FIG. 6.

Figure 20:
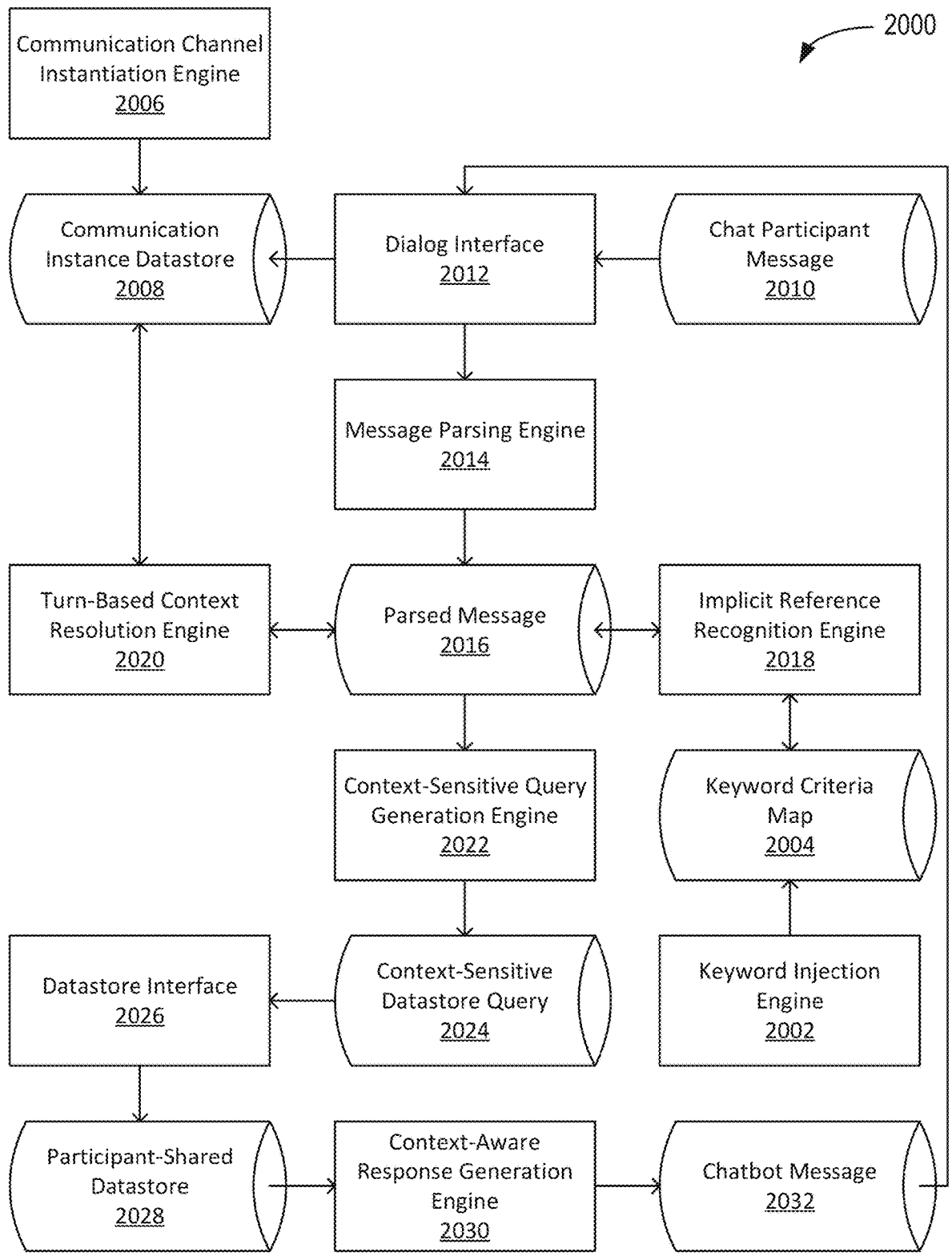
FIG. 20 depicts a diagram of an example of an implicit reference reckoning, turn-based context-aware chatbot system with operational flow.

FIG. 20 depicts a diagram 2000 of an example of an implicit reference reckoning, turn-based context-aware chatbot system with operational flow. The diagram 200 includes a keyword injection engine 2002, a keyword criteria map 2004, a communication channel instantiation engine 2006, a communication instance datastore 2008, a chat participant message 2010, a dialog interface 2012, a message parsing engine 2014, a parsed message 2016, an implicit reference recognition engine 2018, a turn-based context resolution engine 2020, a context-sensitive query generation engine 2022, a context-sensitive datastore query 2024, a datastore interface 2026, a participant-shared datastore 2028, a context-aware response generation engine 2030, and a chatbot message 2032. The flow of the system has two asynchronous starting points.

The keyword injection engine 2002 is intended to represent one of the starting points of the operational flow of the implicit reference reckoning, turn-based context-aware chatbot system. In a specific implementation, a human or artificial agent of the chat initiator uses the keyword injection engine 2002 to identify a domain-specific keyword with a special meaning in the given domain. The domain can be static (e.g., for a system that does not deviate from a domain or domains in which the keyword has the special meaning) or dynamic (e.g., whether the keyword is applicable depends on context). In a specific implementation, the agent of the chat initiator is a platform developer who codes a subroutine that enables a message parser to determine how to parse and interpret a message that includes the keyword. In an alternative, the agent enters the keyword and its intended meaning and the input is either converted to a subroutine format using a template or is interpreted later.

The keyword criteria map 2004 is intended to represent a datastore that includes a mapping of the injected special keyword to a meaning. The map can be applicable to one or more identified tables of a relational database, specific contexts (including participant identity or role, permissions, domains, or other factors). The asynchronous dataflow from the keyword injection engine 2002 to the keyword criteria map 2004 ends with the mapping of the keyword.

The communication channel instantiation engine 2006 is intended to represent technology suitable for establishing a communication channel between a chat participant and a chatbot. In a specific implementation, the communication channel instantiation engine 2006 includes an interface to a messaging platform. Alternatively, the communication channel instantiation engine 2006 could be characterized as the messaging platform.

The communication instance datastore 2008 is intended to represent a datastore of communication state after establishing a communication channel between a chat participant and a chatbot. In a specific implementation, the communication instance datastore 2008 includes other data, such as demographic, geographic, behavioristic, psychographic, or other data about the chat participant, accounts or permissions of the chat participant, context that can be derived from a port, IP address, MAC address, or other identifier or classifier, or the like. The diagram 2000 includes a flow indicator from the communication channel instantiation engine 2006 to the communication instance datastore 2008 that suggests at least some data is captured in association with channel instantiation, though that is not necessarily the case. Specifically, a chatbot could rely entirely upon messages received from a chat participant (and nothing else besides domain knowledge).

The chat participant message 2010 is intended to represent a raw message from a chat participant. The raw message can be in the form of natural language. For illustrative purposes, messages are assumed to be text, though there is no technical reason the system could not handle voice messages, as well.

The dialog interface 2012 is intended to represent an interface suitable for receiving the chat participant message 2010. In a specific implementation, the dialog interface 2012 is an interface to a messaging platform. The data flow from the chat participant message 2010 is through the dialog interface 2012 to the communication instance datastore 2008, where state is updated to reflect receipt of the raw message. In a specific implementation, the raw message is also retained as historical data within the communication instance datastore 2008. Alternatively, the raw message can be replaced with the parsed message 2016 when it becomes available.

The message parsing engine 2014 is intended to represent an engine that parses the chat participant message 2010 to obtain the parsed message 2016. In a specific implementation, this involves natural language processing techniques. The data flow from the chat participant message 2010 is through the dialog interface 2012 and the message parsing engine 2014 to the parsed message 2016. For illustrative purposes, the parsed message 2016 is modified in stages as described in the next couple paragraphs, though this is not intended to rigidly represent a specific physical or logical reality; it is conceptual and any applicable physical storage or logical parsing is permitted.

The implicit reference recognition engine 2018 is intended to represent an engine that identifies implicit references in the chat participant message 2010. The implicit reference recognition engine 2018 identifies an implicit reference by matching a text string (e.g., a word or phrase) in the chat participant message 2010 to a text string in the keyword criteria map 2004. Matching can be accomplished using regular expressions, explicit text string matches, or the like. The data flow from the parsed message 2016 through the implicit reference recognition engine 2018 to the keyword criteria map 2004 and back again is intended to represent reading the parsed message 2016 to obtain words for lookup, accessing the keyword criteria map 2004 for lookup/matching, and updating the parsed message 2016 to convert the implicit reference to an explicit reference. It should be understood that an alternative is to update the query later, as opposed to updating the parsed message 2016 now.

The turn-based context resolution engine 2020 is intended to represent an engine that considers at least context derived from a dialog turn of which the chat participant message 2010 is a part. Instead or in addition, the turn-based context resolution engine 2020 can consider context based on dialog turns that preceded the chat participant message 2010. In a specific implementation, the turn-based context resolution engine 2020 adds missing elements to the parsed message 2016 that can be determined from context. The data flow from the communication instance datastore 2008 through the turn-based context resolution engine 2020 to the parsed message 2016 and back again is intended to represent updating the parsed message 2016 based on context and providing an update to the communication instance datastore 2008 regarding other updates to the parsed message 2016 (e.g., by the implicit reference recognition engine 2018). It should be understood that an alternative is to update the query later, as opposed to updating the parsed message 2016 now.

The context-sensitive query generation engine 2022 is intended to represent an engine that converts natural language to a query. In a specific implementation, the engine performs natural language to SQL (NL2SQL). However, the conceptual diagram 2000 is intended to also work for the purpose of both generating SQL queries and providing a help document to a chat participant in a help context or to provide some other datastore that is obtained by considering context even for implementations that include multiple different query or command formats.

The context-sensitive datastore query 2024 is intended to represent a datastore of a query or command that is to be directed to a datastore, in the format appropriate for the intended access. For example, the context-sensitive datastore query 2024 can be an SQL query if an SQL database is to be accessed or a file request if the access is to a file repository.

The datastore interface 2026 is intended to represent some form of CRM that enables access to a datastore. For a database, this would typically be characterized as a database interface. For remote data, the datastore interface 2026 can be characterized as including a network interface.

The participant-shared datastore 2028 is intended to represent a datastore that includes data that can be shared with the chat participant. This can include public information or private information that is provided only to authorized individuals, is password protected (that may or may not be accessible if a relevant code is included in the communication instance datastore 2008), or is otherwise restricted in some manner, assuming the chat participant is authorized. The data flow from the context-sensitive query generation engine 2022, through the context-sensitive datastore query 2024 and datastore interface 2026, and to the participant-shared datastore 2028 is intended to represent the generation of a query that is used to access the participant-shared datastore 2028.

The context-aware response generation engine 2030 is intended to represent an engine that incorporates the results of the participant-shared datastore query into the chatbot message 2032, which is provided to the dialog interface 2012 for display to the chat participant. The data flow from the context-aware response generation engine 2030 through the chatbot message 2032 and the dialog interface 2012, to the communication instance datastore 2008 is intended to represent the message that incorporates the response and becomes part of the communication instance data. Instead or in addition, the context-aware response generation engine 2030 can perform some other action, such as adding an entry to the chat participant's calendar, uploading a file to the chat participant's device, or the like, but this is not shown in the diagram 2000. Also, it may be noted a response to a database query may be returned through a database interface (e.g., the datastore interface 2026) but the diagram 2000 illustrates the conceptual flow, omitting the path back through the datastore interface 2026, if applicable.

The invention claimed is:

1. A system comprising:
   an intent recognition engine;
   a turn-based context resolution engine coupled to the intent recognition engine;
   a table detection engine coupled to the turn-based context resolution engine;
   a criteria update engine coupled to the turn-based context resolution engine;
   an implicit reference resolution criteria extraction engine coupled to the turn-based context resolution engine;
   the implicit reference resolution criteria extraction engine coupled to the intent recognition engine;
   a keyword injection engine coupled to the implicit reference resolution criteria extraction engine, wherein the keyword injection engine is configured to identify a domain-specific keyword with a first meaning;
   a keyword criteria map datastore that includes a mapping of the domain-specific keyword to a second meaning, and coupled to a criteria memory and the implicit reference resolution criteria extraction engine;
   a communication instance datastore, coupled to the turn-based context resolution engine, that includes communication instance data, wherein a message of a dialog turn represented in the communication instance data includes an implicit reference to a table;

wherein, in operation, the implicit reference resolution criteria extraction engine includes a stack used to extract a criteria tuple from the dialog turn, the turn-based context-resolution engine determines context for the dialog turn using the communication instance data, the intent recognition engine determines an intent associated with the dialog turn using the context, the implicit reference resolution criteria extraction engine resolves the implicit reference and extracts criteria that match the implicit reference, and the turn-based context resolution engine generates a query associated with the table using the extracted criteria.

2. The system of claim 1, wherein, in operation, the table detection engine matches the intent to the table.

3. The system of claim 1, wherein, in operation, the criteria update engine updates the communication instance datastore in accordance with the intent.

4. The system of claim 1 comprising a help document datastore coupled to the turn-based context resolution engine, wherein, in operation, the turn-based context resolution engine determines that the context for the dialog turn is a help context and wherein the query accesses a help document from the help document datastore.

5. The system of claim 1 comprising a text-to-Structured Query Language (SQL) generator coupled to the turn-based context resolution engine, wherein, in operation, the text-to-SQL generator converts text associated with the message and the criteria to an SQL language element.

6. The system of claim 1 comprising a Structured Query Language (SQL) generator coupled to the turn-based context resolution engine, wherein the query is an SQL query.

7. The system of claim 1 wherein the implicit reference resolution criteria extraction engine extracts the criteria tuple.

8. The system of claim 1 wherein the dialog turn is a second dialog turn and wherein the communication instance datastore includes historical dialog state for dialog turns, including a first dialog turn and the second dialog turn, following a communication channel instantiation.

9. The system of claim 1 wherein the criteria update engine updates the communication instance datastore with a second criteria tuple in accordance with the intent from the dialog turn.

10. The system of claim 1 wherein the dialog turn is a second dialog turn and wherein implicit reference resolution criteria extraction engine creates the criteria tuple when the turn-based context resolution engine finds no context from the second dialog turn, and takes context from a first dialog turn from the communication instance datastore.

11. The system of claim 1 wherein the implicit reference resolution criteria extraction engine, when a second dialog turn is given with implicit intent and no context, searches the database with the domain-specific keyword and ranks the second dialog turn.

12. The system of claim 1 wherein the keyword injection engine enables a human or artificial agent to inject domain-specific keywords, including the domain-specific keyword, and the implicit resolution criteria extraction engine utilizes the domain-specific keywords while extracting the criteria tuple.

* * * * *